United States Patent [19]
Auer et al.

[11] Patent Number: 5,726,776
[45] Date of Patent: Mar. 10, 1998

[54] METHOD AND ARRANGEMENT FOR SYNCHRONIZING THE IMAGE RECORDINGS OF MONOCHROME AND COLOR RECORDINGS BY MEANS OF LIGHT-SENSITIVE SENSORS

[75] Inventors: Michael Auer; Hans-Peter Grossmann; Joachim Ihlefeld, all of Dresden; Michael Pester, Radeberg; Günther Uhlig; Lutz Wenert, both of Dresden, all of Germany

[73] Assignee: F & O Electronic System GmbH, Neckarsteinach, Germany

[21] Appl. No.: 578,560

[22] PCT Filed: Jun. 27, 1994

[86] PCT No.: PCT/DE94/00725

§ 371 Date: Feb. 22, 1996

§ 102(e) Date: Feb. 22, 1996

[87] PCT Pub. No.: WO95/01042

PCT Pub. Date: Jan. 5, 1995

[30] Foreign Application Priority Data

Jun. 25, 1993 [DE] Germany .................. 43 21 180.1

[51] Int. Cl.$^6$ .............. H04N 1/04; H04N 1/23; H04N 1/36
[52] U.S. Cl. ............ 358/494; 358/300; 358/306; 358/412; 358/409; 358/410
[58] Field of Search ............ 358/494, 300, 358/406, 412, 468, 486, 409, 410, 482, 319, 320, 337; 348/138, 142, 180, 521, 536; 382/107

[56] References Cited

U.S. PATENT DOCUMENTS

| | | | |
|---|---|---|---|
| 4,453,170 | 6/1984 | Arao | 346/160 |
| 4,801,978 | 1/1989 | Lama et al. | 358/300 |
| 4,862,512 | 8/1989 | Hidaka et al. | 358/471 |

FOREIGN PATENT DOCUMENTS

| | | |
|---|---|---|
| 0301506 | 2/1989 | European Pat. Off. . |
| WO9200574 | 1/1992 | Germany . |

*Primary Examiner*—Kim Vu
*Assistant Examiner*—Tia M. Harris
*Attorney, Agent, or Firm*—Horst M. Kasper

[57] ABSTRACT

Figure 1:
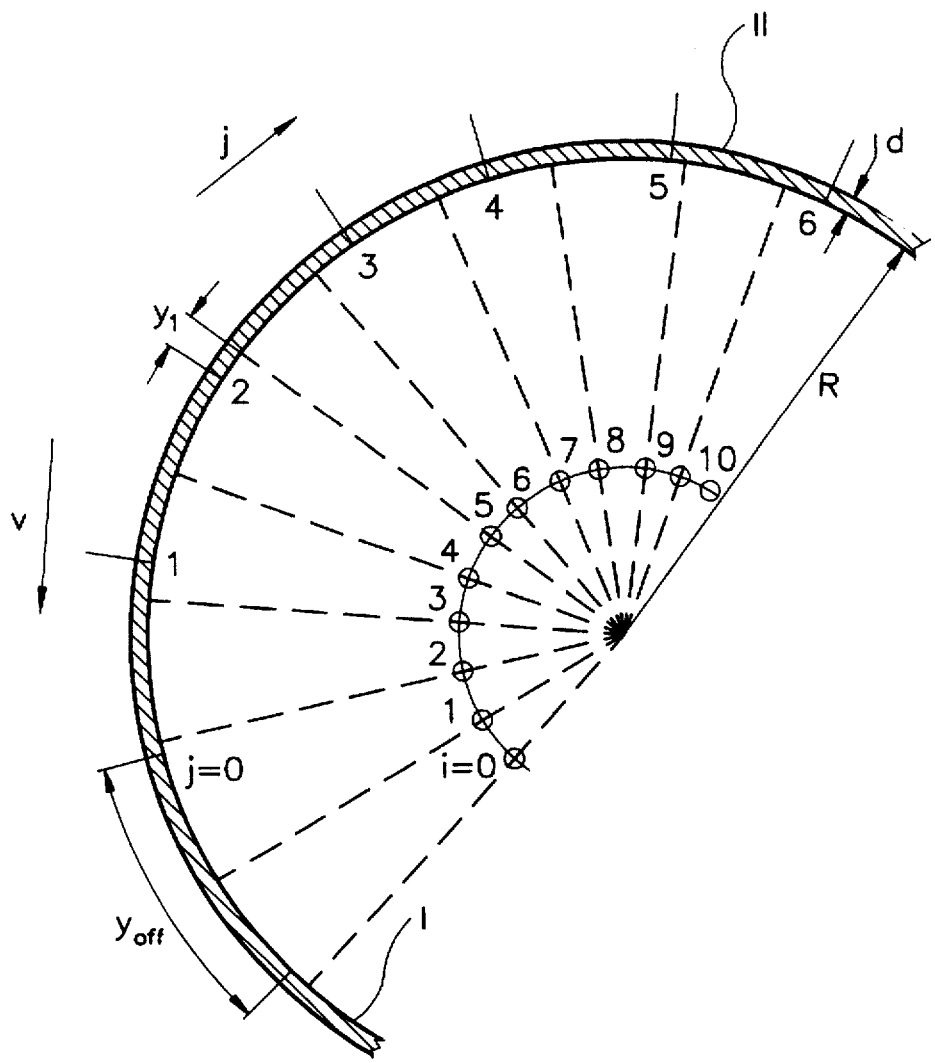

The invention relates to a method and to an arrangement for the synchronization of the image recording of monochrome recordings and color recordings with photosensitive line sensors. A line-scanning pattern is generated by a programmable counter arrangement, wherein the timer measures the phase position of the line-scanning pattern, generated by the counter arrangement, with the aid of the computer and the programmable counter arrangement at the point in time of the impinging of a pulse of the incremental transmitter, wherein the timer compares these with a coordinated calculated or tabulated reference value, and wherein the timer employs the thus obtained phase difference in order to influence a counter, preconnected to the line counter CT2, in its count volume (FIGS. 1 and 2). The timer splits the measurement lines of the image recording device into two or more scanning lines if the integration time of the photosensitive lines within the measurement line results in an exposure higher than the operating limit of the sensors.

16 Claims, 7 Drawing Sheets

METHOD AND ARRANGEMENT FOR SYNCHRONIZING THE IMAGE RECORDINGS OF MONOCHROME AND COLOR RECORDINGS BY MEANS OF LIGHT-SENSITIVE SENSORS

TECHNICAL FIELD

The invention relates to a method for the synchronization of image recordings of monochrome recordings and color recordings with light-sensitive sensors according to the preamble of patent claim 1 as well as to an arrangement associated therewith.

STATE OF THE ART

A digital scanning of the picture patterns, moving relative to the image-recording camera, is realized technically in general with charge-coupled device (CCD) line cameras. Incremental transmitters are employed for the synchronization in particular in case of rotating picture patterns, where the pulses of the incremental transmitter are employed directly for the exposure control of the lighting equipment. Furthermore, the control signals are generated from these pulses for the image storage for storing the scanned digital image values.

This method suffices for the applications with a nearly constant transport speed and in cases, where only modest requirements are imposed on the recording quality. In case of precision applications with a variable transport speed, the present rigid coupling between the pulses of the incremental transmitter and the integration cycle of the charge-coupled device (CCD) line camera results in measurement errors. These measurement errors are then expressed in a speed-dependent phase shift in transport direction between the reference grid of a line-scanning pattern on the line-scanning pattern and the actually measured actual grid of the line-scanning pattern. Furthermore, the dividing or splitting errors, mechanical vibrations, and phase noise of the incremental transmitter, as well as further errors affect directly the image recording. A line-scanning pattern is required which is freely programmable in its parameters offset and line distance for a series of applications, wherein the freely programmable line-scanning pattern cannot be realized with the known rigid coupling between the pulses of the incremental transmitter and the line addresses.

In this context, the image recording is realized with one charge-coupled device (CCD) line camera or with several charge-coupled device (CCD) line cameras, wherein the several charge-coupled device (CCD) line cameras are combined to form a longer line. In particular, in connection with precision measurements with several color cameras, the absolute color measurement error frequently does not meet the requirements.

An image-scanning apparatus and reading apparatus has become known from the European Patent Application EP-A-0,301,506, wherein the image-scanning and reading apparatus comprises a transparent drum, supporting a plurality of originals, and calibration reference regions, which calibration reference regions serve as references during reading of the originals. A scanning head scans the rotating drum. A computer unit includes a memory storage for storing the calibration reference regions of the drum. The position of the calibration reference regions is stored at a time prior to the reading of the originals. If the scanning process is started, then the scanning head is moved to the stored position of a first calibration reference region, the calibration is performed, and the original belonging thereto is read in that the calibration data is stored. The scanning process of each successively following original is similar to the preceding one by recalibrating by means of the corresponding reference region, wherein each calibration process occurs during the rotation of the drum.

A time transmitter synchronization system with time pixels for correcting phase jitters for an optical scanning device has become known from the U.S. Pat. No. 4,635,000, which time transmitter synchronization system exhibits a continuously running pixel time source, electronic switching circuits for generating of automatic error control signals with amplitudes, which represent each phase error between the start of the scanning and the start of the pixel count pulses and each phase error between the end of the scanning and the end of the pixel count pulses, as well as electronic switching circuits including a switch filter electronic switching circuit with two storage elements for each inclination of the polygon of the system, in order to generate a frequency correction signal for the pixel time source.

A scanning device with variable speed of the transport of documents for generating data, which represent images on the document, has become known from the European Patent document EP-A-0,142,358. The scanning device includes a compact, time-integrating photo line detector and a device for generating cyclical signals of the line detector, which cyclical signals represent the images, as well as a document transport system for the relative motion of the line detector relative to the document, in order to capture optically successively following images of the line detector, wherein the data are processed in a synchronization device. The synchronization device includes a device, responding to the motion of the document relative to the line detector, which synchronization device generates every time a control signal when the document has been moved by a predetermined distance relative to the line detector. A cycle pulse time mark generator clocks the linear line detector. Logic devices respond to the control signals and to the cycle pulse time marks, in order to pass only those signals for the method, which signals were generated by the line detector based on the occurrence of a predetermined connection between the appearance times of a control pulse and of a cycle pulse time mark.

TECHNICAL OBJECT

It is an object of the present invention to furnish a method for the synchronization of the image recording of monochrome recordings and color recordings with photosensitive line sensors according to the recited kind, wherein the measurement accuracy for monochrome recordings and for color recordings is improved, wherein the construction of a charge-coupled device CCD line camera is also to be improved with respect to the measurement accuracy for monochrome recordings and for color recordings.

DISCLOSURE OF THE INVENTION AND OF ITS ADVANTAGES

The solution of the object according to the invention comprises that the line-scanning pattern is generated by a programmable counter arrangement, which includes a measurement line counter (CT2) and a further counter (CT1), preconnected to the measurement line counter (CT2), and wherein the computer and the programmable counter arrangement measure the phase position of the line-scanning pattern, generated by the counter arrangement, at the point in time of the arrival of a pulse of the incremental transmitter, wherein the computer and the programmable counter arrangement compare the phase position with a coordinated calculated or tabulated reference value of a reference value table, and wherein the computer and the programmable counter arrangement employ the thus obtained phase difference to influence the counter (CT1) in its count volume, where the counter (CT1) is preconnected to the measurement line counter (CT2) in order to generate therefrom the exact position of the measurement lines. The timer subdivides or splits the measurement lines of the image recording device into two or several scanning lines, if the integration time of the light-sensitive sensor within a measurement line results in an exposure higher than the operating limit of the sensor.

The method and the invention arrangement are associated with the advantage that they provide a geometrically equalized line-scanning pattern of the picture pattern to be recorded, where the line-scanning pattern is freely programmable in its parameters image start and line width, and where the line-scanning pattern is freed as much as possible from an interfering phase jitter. The line-scanning pattern is freely programmable relative to its parameters offset and line distance such that the rigid coupling is eliminated between the pulses of an incremental transmitter and the line addresses.

Figure 2A:
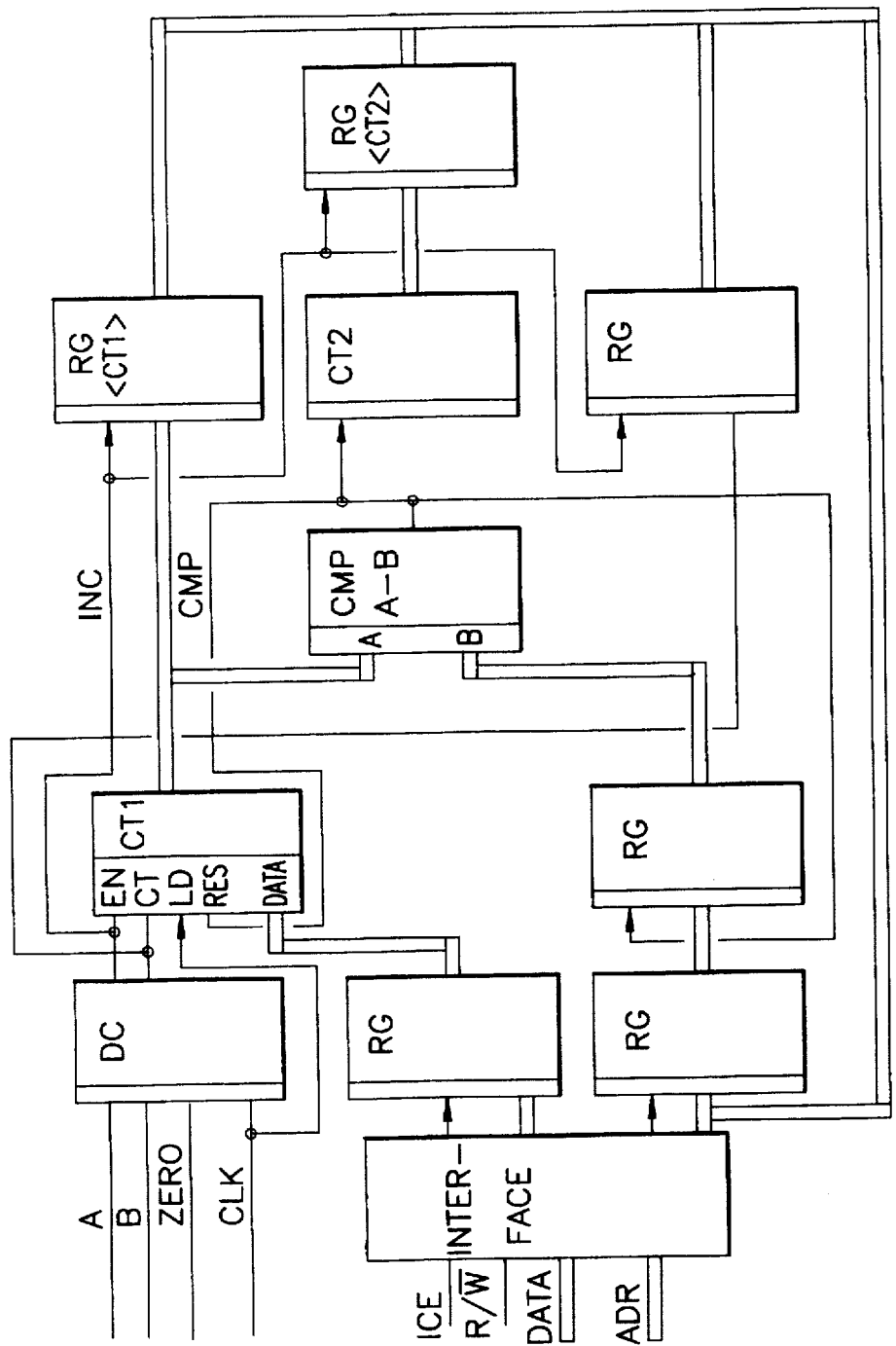
Figure 2B:
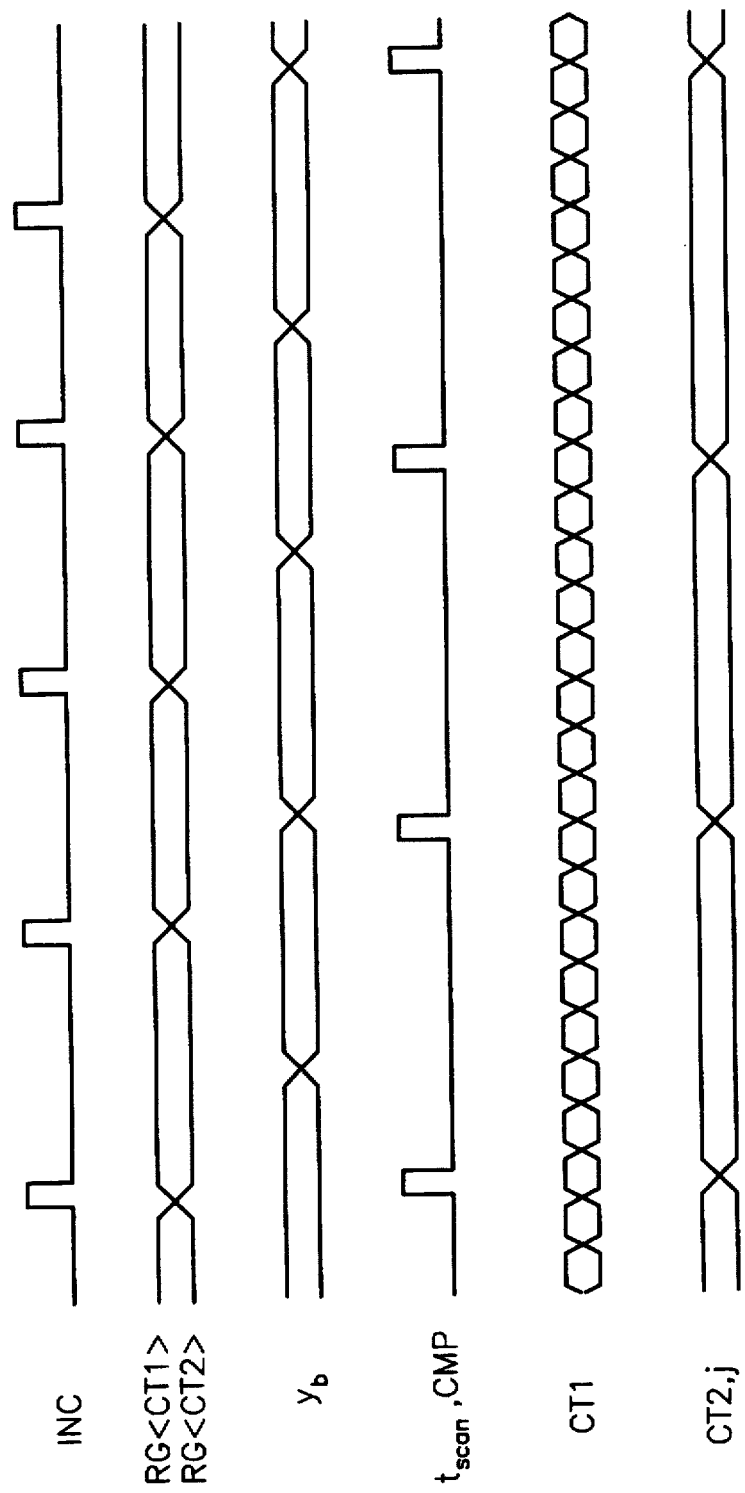
Figure 3:
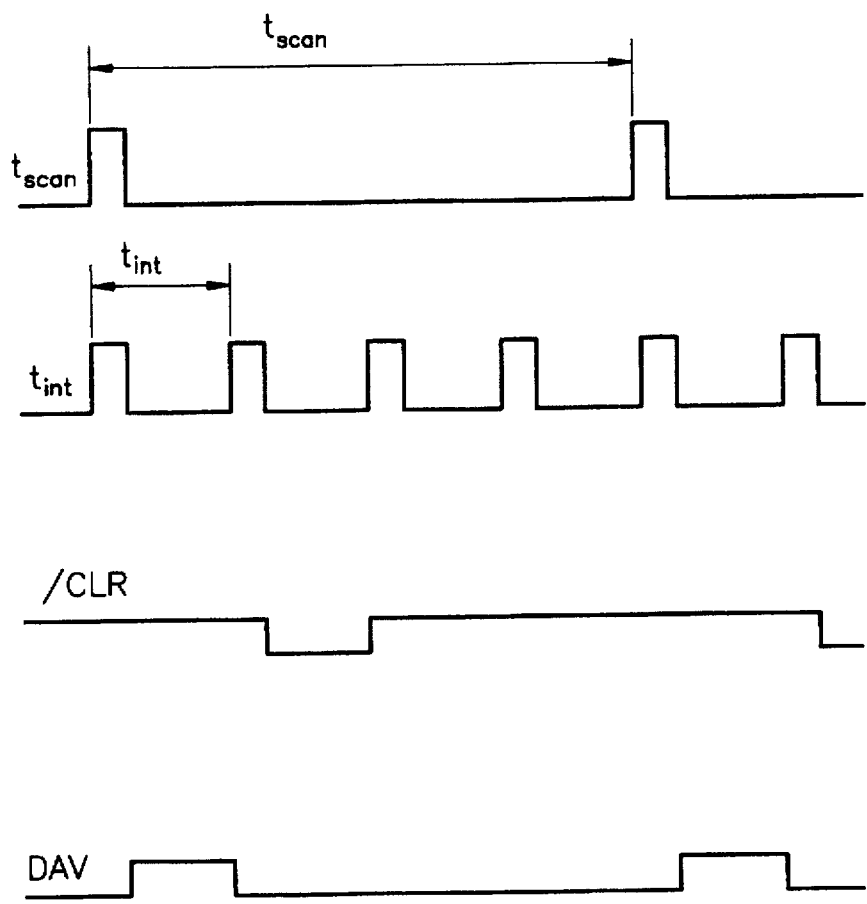
Figure 4A:
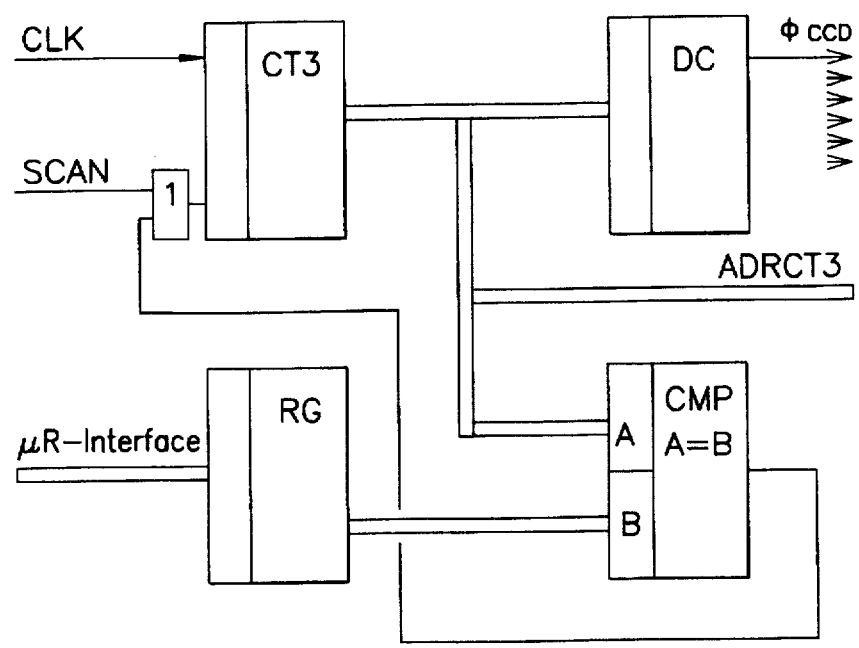
Figure 4B:
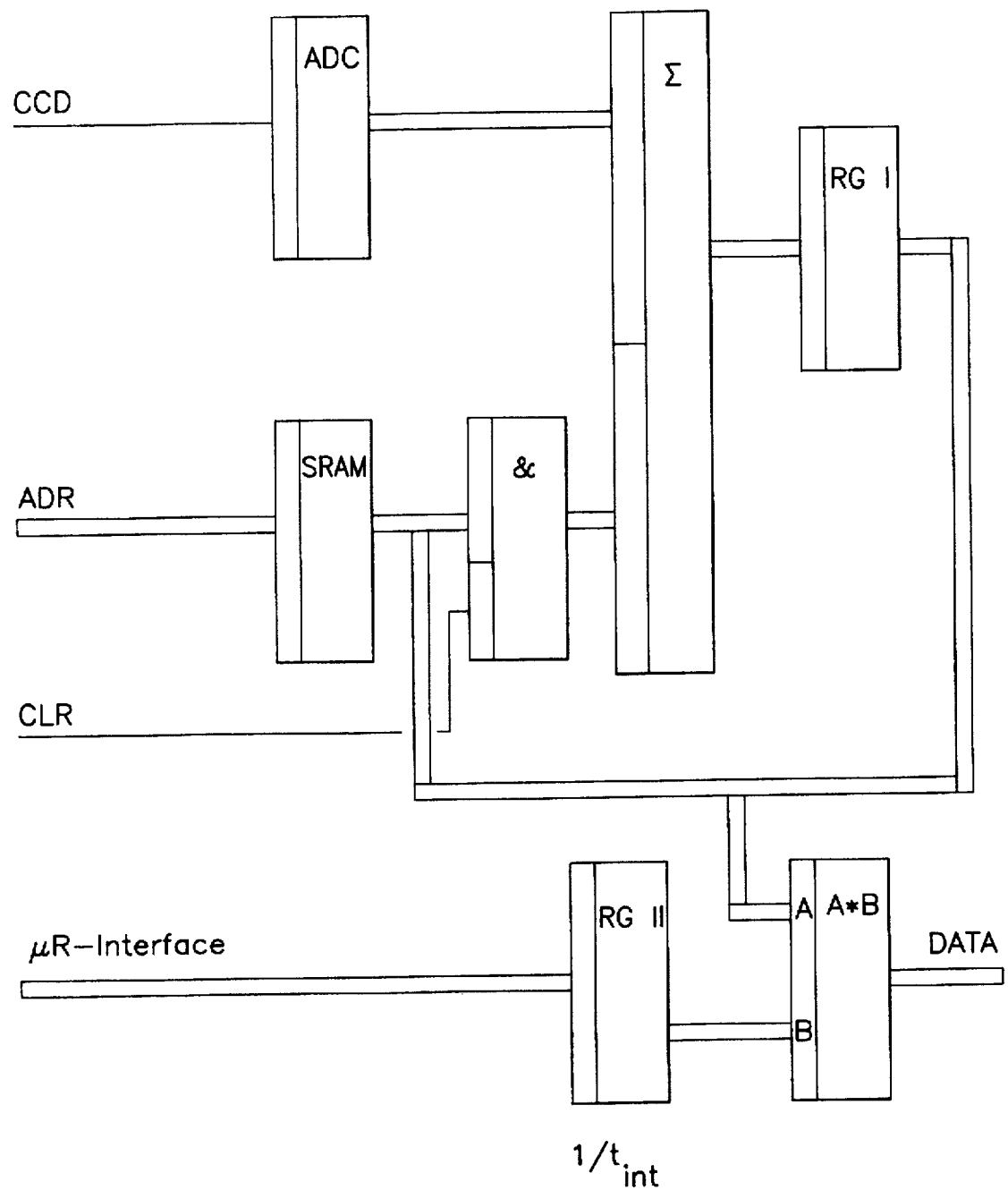
Figure 6:
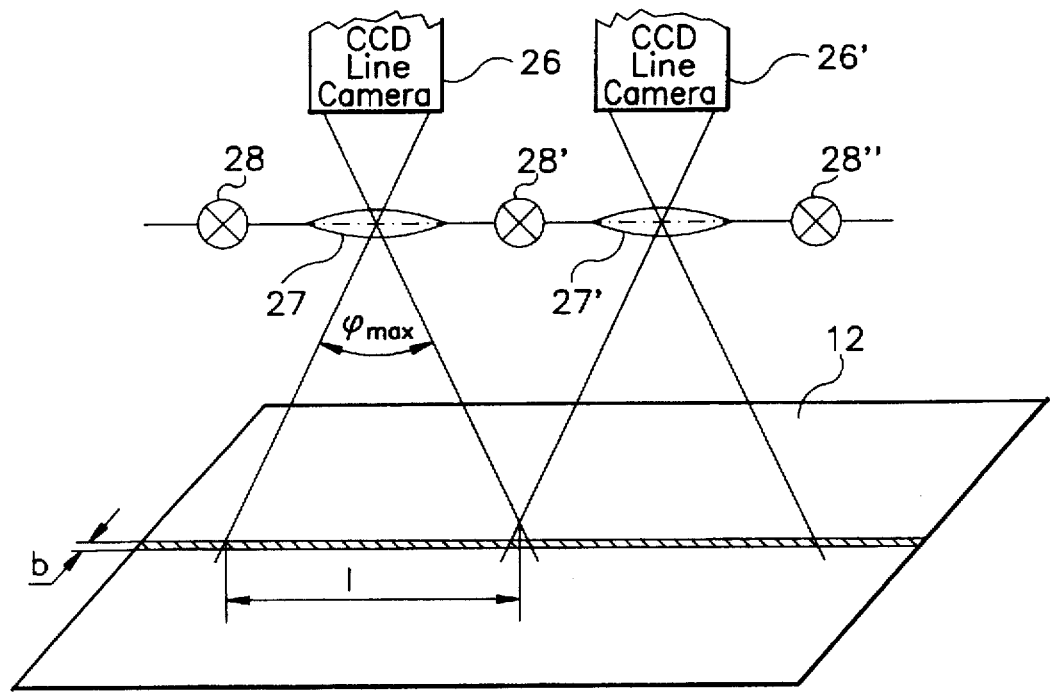
Figure 5:
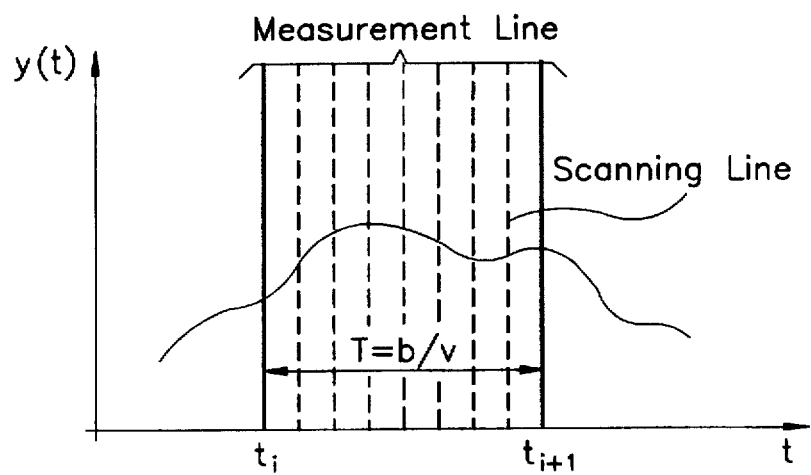

Brief description of the drawing, where there is shown:

FIG. 1—a view in principle of the synchronization arrangement with an incremental transmitter FIG. 2a—a hardware structure FIG. 2b—the timing arrangement FIG. 3—the derivation of the charge-coupled device CCD integration cycles FIG. 4a—an arrangement for the derivation of the charge-coupled device CCD pulses FIG. 4b—an arrangement for processing signals FIG. 5—the definition of a measurement line between two trigger points of the incremental transmitter with intermediately disposed scanning lines, for example, 1024 per image and FIG. 6—an arrangement of charge-coupled device CCD line cameras, of the optical objectives and of the illumination sources relative to the picture pattern.

Paths for the performance of the invention:

The mode of operation of the invention method and the arrangement of the charge-coupled device CCD line camera are to be illustrated in an exemplified embodiment based on the following representations in connection with the operation of the image-recording camera at a print machine with one print cylinder I.

FIG. 1 shows the position of the already preprocessed pulses of an incremental transmitter. Each of the represented small circles 0 to 10 corresponds to one pulse marked with i, of the incremental transmitter. The paper transport is performed on the surface of the cylinder I, the paper II is illustrated with dashed lines and has a thickness d. The printed surface of the paper is now to be recorded subject to an offset $y_{off}$ with a line distance $y_b$ with a charge-coupled device CCD line camera. The lines are furnished with the index j. In general, lines and increments are not identical. In order to avoid rounding errors, not only the integer but also the fractional rational part of the line address is evaluated for each flank of the incremental transmitter.

A phase comparison between the position of the print cylinder and the actual position of the line-scanning pattern is performed for each flank of the incremental transmitter.

The following relation holds in this case:

$$\bar{\phi}_i *(R+k*d)=y_{off}+j*y_b+y_1 \quad (1)$$

where:

$\bar{\phi}_i$—expectation value of the angle of the incremental transmitter

2R —diameter of the cylinder k—constant 0<k<1 d—paper thickness $y_b$—line width j—line index, line address $y_1$—fractional rational part of the line address The actual phase of the line-scanning pattern with the line index j and the fractional rational part $y_1$ could be determined according to the equation (1) for each flank of the incremental transmitter i under the theoretical assumption that the transport speed is constant and that the incremental transmitter does not deliver any measurement errors, and one could compare the actual phase with the reference phase and thus synchronize a freely oscillating generator for the line frequency.

Variations of the line width and of the line position result in case of the practically important case that the incremental transmitter does not deliver an equidistant pulse sequence, which may be based on mechanical disturbances at the print cylinder or on measurement errors, which are caused, for example, by mechanical transfer errors or based on production tolerances of the line disk of the transmitter, wherein the variations can result in erroneous system reactions based on the high sensitivity. For this purpose, the systematic components of these errors are initially taught in a teach-in process. For this purpose, the expectation values for the angles $\phi_i$ are averaged over several rotations in a computer and are entered into a table. The reference values of the integer and of the fractional rational part of the line address according to equation (1) are calculated from these expectation values for each pulse of the incremental transmitter. The thus determined table is maintained in the computer and is again loaded for each new parameter set ($y_{off}$, k, d, $y_b$) according to equation (1).

In order to correct for geometrical errors, the coordination of the expectation value of the angle $\phi_i$ and (y, $y_1/y_b$) can also be superposed with a nonlinear correction function. The parameter k is a value which is dependent on the material. This parameter is employed together with $y_{off}$ in order to ensure the exact position of the line-scanning pattern at the starting point of the image and at the end of the image.

A correction value k×d enters in addition to the diameter 2R of the print cylinder I, wherein the correction value k×d depends on the paper thickness d and on the material parameters. This correction allows to generate images independent of the paper thickness d which are congruent to the offline image data of a flatbed scanner and which can be employed directly for a comparison reference image/actual image.

A practical realization is described in an embodiment according to FIG. 2a. A decoder DC generates cycle (INC) pulses and reset (ZERO) pulses from the starting signals of the incremental transmitter. These pulses control a first counter CT1, cycle-clocked with a high frequency CLK, where the count volume of the counter CT1 can be programmed based on an interface INTERFACE. Upon running through the zero passage ZERO of the incremental transmitter, this counter CT1 is set to an also programmable value and a counter CT2 is reset. The count volume can be corrected with each cycle of the incremental transmitter. Always then, when the counter CT1 generates a transfer pulse, the counter CT2 increases by 1. Furthermore, the actual count state of the counters of CT1 and CT2 is intermediately stored in registers with the pulse of the incremental transmitter, also the zero passage ZERO. The same pulse releases at the corrected microcomputer a control signal such that this microcomputer can receive the count state of the counters from CT1 and CT2 as well as ZERO. The count state of the counters corresponds to the fractional rational part and to the integer part of the line address for the image recording. Furthermore, the index i of the actual increment of the incremental transmitter is known to the computer by a counting along.

The microcomputer calculates in real time a phase difference between the reference phase and the actual phase according to equation (2) with the thus obtained measurement values:

$$Y(t) = Y_i(CT2) - j + y(CT1)/y_z \frac{yl}{yb} \quad (2)$$

where $y_i(CT2)$—actual content of the line counter CT2, buffered at the point in time of the $i^{th}$ pulse of the incremental transmitter in the coordinated register, j—reference value of the line counter from the table, $y(CT1)$—actual content of the counter CT1 at the point in time of the $i^{th}$ pulse, $y_z$ —actual count volume of CT1 loaded in the coordinated register, $y_l$ —reference value of the fractional rational part of the line address from the table, $y_b$—line width.

The phase difference $\Delta y(t)$ is smoothed by means of a sliding average-value filter according to the following equation (3), and a new actual line length is calculated from this value with the following equation (4), wherein the new actual line length is output by means of the interface to CT1:

$$\Delta y_m(i) = \tau^* \Delta y_i + \Delta y_m(i-1) \quad (3)$$

where $\Delta y_m(i)$—sliding average value $\tau$—time constant $$<RG(y_z)> := <RG(y_z)> + \gamma^* \Delta y_m(i) \quad (4)$$

where $<RG(y_z)>$—contents of the input/output register for the control of the count volume of CT1

$\gamma$—automatic control amplification.

By outputting the result, calculated according to equation (4), to the register $RG(y_z)$, the automatic control circuit is closed; the respective timing is illustrated in the diagram of FIG. 2b.

According to the described method, it is possible to furnish a geometrically equalized line-scanning pattern of the picture pattern to be recorded, where the line-scanning pattern is freely programmable with respect to its parameters image start and line width, and where the line-scanning pattern is freed as much as possible from an interfering phase jitter.

In the following, reference is made to FIGS. 3 through 4b. In case of variable transport speeds, an integration time, adapted to the line width, leads to a sensitivity of the arrangement dependent on the transport speed, wherein the sensitivity in many cases exceeds the dynamic region of the charge-coupled device CCD line. Known methods and arrangements, such as the insertion of a neutral wedge filter or the changing of the exposure strength, are unsuitable for precision applications based on the relatively high errors. For this purpose, a measurement line on the object is subdivided or split into several successively following scanning lines, if the permissible dynamic region has been exceeded. The measurement line is split or subdivided in n scanning lines of equal size, which is illustrated in FIG. 5. A measurement line is disposed between two trigger points $t_i$ and $t_{i+1}$ of the incremental transmitter, wherein each trigger point marks the line start. A number of scanning lines with the effective integration time $T=b/v$ is disposed between the measurement line b. For this purpose, a line-scanning pattern with the pixel distance b*b, for example with b=3 mm, is placed onto the image field and the pulses of the incremental transmitter are evaluated at the transport cylinder. At the beginning of each measurement line, a trigger pulse of a timer is released. Based on the variable transport speed, there results the requirement for an automatic control of the sensitivity of the charge-coupled device CCD line(s) of the charge-coupled device CCD camera, which is preferably performed digitally.

It is illustrated in FIG. 3 that an estimate of the optimum subdivision of the integration regime for the actual measurement line is determined on the basis of the measurement of the time duration of the respectively preceding interval. The already described computer, preferably a microcomputer, reads the time duration of the preceding measurement line and calculates therefrom the intervals of the scanning lines according to equation (5):

$$<RG(t_{int})> := t_{scan}/[1 + int(t_{scan}/t_{intmax})] \quad (5)$$

where int—function integer, integer part of $t_{int}$—integration time of the charge-coupled device CCD line $t_{scan}$—scanning time for a measurement line $t_{int\,max}$—maximum integration time of the charge-coupled device CCD line limited by a level control These scanning lines are accumulated in the following image-point by image-point in the framework of the measurement line, the corresponding dark current values are subtracted; and then the thus obtained value is divided by the effective integration time. The advantage of this method comprises a high signal/noise ratio, in particular during the teach-in at low transport speeds. A further advantage comprises the constant value of the aperture of the individual image points such that there results an improved measurement accuracy of the details of the image having a high contrast.

A possible circuit-technical realization is represented in FIG. 4a and illustrated in the following. A counter CT3, operated with a high clock-cycle frequency CLK, is reset with each rising flank of the integration cycle of the measurement lines and then counts a number of cycles programmable by $RG(t_{int})$. The outputs of CT3 are fixedly connected to the cycle regime of the charge-coupled device CCD lines such that a decoder DC generates directly the cycles necessary for the operation of the lines.

The analog voltages, obtained at the outputs of the charge-coupled device CCD lines, are transformed in a conventional way into digital signals after a double correlated scanning. The thus obtained digital scanning values are accumulated image point by image point; one of the possible embodiments for this purpose is illustrated in FIG. 4b.

The data pass from an analog-digital converter ADC to a data input of an adder $\Sigma$ which is for example 16 bit wide. The second data input of the adder is connected to the output of a static random access memory SRAM by means of an AND connection. The addresses of the static random access memory SRAM are activated by CT3 according to FIG. 4a. The output of the adder Σ can be connected by means of a register RGI to the databus of the static random access memory SRAM.

After the in each case first scanning line, defined in the cycle regime, within a measurement line, there appear the first valid data of the new measurement line. These first valid data are directly written in the static random access memory SRAM, in that a zero is forced through the AND connection at an input of the adder Σ. With the next scanning line, the AND connection switches the data through, and it is accumulated. The accumulated data are in each case valid in the first scanning line of the next following measurement line. A 16-bit input of a multiplier A*B, preferably a hardware multiplier, follows at the output of the register following to the adder Σ. The second input is connected to a further register RGII, where the reciprocal value of the effectively acting integration time is written by the microcomputer for a period of a measurement line. The normalized data DATA are generated at the output of the multiplier and the normalized data DATA can be further processed in a conventional way.

A further embodiment, which furnishes a good approximation in connection with a simplified realization comprises that the exposure time of the charge-doubled device CCD line is maintained constant for all transport speeds. For this purpose, it is required that the offset of the line-scanning pattern $y_{of}$ is shifted proportional to speed. The offset change $\Delta y_{of}$, i.e. the shifting of the starting point in time for the integration in running direction, results according to simple geometric considerations from the half time of a scanning time decreased by the half constant integration time of the charge-coupled device CCD line. In this situation, the position of the center of gravity of the scanned lines is preserved. The offset change $\Delta y_{of}$ results in:

$$\Delta y_{of}=y_b/2-v^*t_{int}/2 \qquad (6)$$

where
v—transport speed

An adapted method and an arrangement for the performance of a color measurement with m channels and several measurement modules is characterized by the following features, where the method employs sensor lines for the recording of objects moving relative to the sensor:

a) the object is imaged over n first objectives in n measurement modules on n line-shaped image conductors, b) the n image conductors are combined on the output side to an optical plug connector such that the n line-shaped image conductors form a regular layer structure, c) the outputs of the image conductors are imaged by means of an optical relay system (receiver optic) onto m sensors by means of second objectives and possibly further objectives, beam splitters or subdividers and/or color subdividers and/or color filters, d) each of the m sensors comprises a regular structure with at least n photosensitive lines, or e) the object is imaged by means of n first objectives into m measurement modules onto n line-shaped image conductors, which comprise m layers, f) the m*n outputs of the image conductors in m plug connectors are combined with a regular layer structure such that exactly one image conductor of each measurement head module is contained in the respective plug connector, g) each one of the m optical plug connectors is imaged onto one of the sensors by means of an optical system of two and possibly further objectives and/or color filters, h) each one of the m sensors comprises a regular structure with at least n photosensitive lines.

Furthermore, there is provided an arrangement for the line-by-line synchronization of the image recording of monochrome recordings and color recordings with photosensitive lines of objects moving relative to a sensor, with a timer, a computer, and an incremental transmitter. A programmable counter arrangement generates a line-scanning pattern, and the timer measures the phase position of the line-scanning pattern, generated by the counter arrangement, with the aid of the computer and the programmable counter arrangement at the point in time of the arrival of a pulse of the incremental transmitter, and the and the timer compares these with a coordinated calculated or tabulated reference value of a reference value table, and employs the thus obtained phase difference in order to influence a counter, preconnected to the line counter CT2, in its count volume (FIG. 1 and FIG. 2). The timer subdivides or splits the measurement lines of the image recording device into two or several scanning lines if the integration time of the photosensitive lines within the measurement line results in an exposure higher than the operating limit of the sensors.

The charge-coupled device CCD line camera can comprise several compact camera modules, which are disposed next to each other, as is shown in FIG. 6. The image recording is performed by way of charge-coupled device CCD lines, either monochrome lines or color lines, of charge-coupled device CCD cameras 26, 26', which are disposed parallel to the axis of the transport cylinder. The optical image can preferably be realized by vibration-fixed wide-range objectives 27, 27' with a fixed diaphragm and with a fixed metering action. The objective shading of about 40% is at least in part compensated by a suitable distribution of illuminating sources 28, 28', 28", which are alternatingly arranged between the objectives 27, 27'.

Preferably, a measurement field of about 3×3 mm is selected as a dimension of the image elements at a maximum transport speed of the picture pattern 12 $v_{max}$=10 m/s, wherein a higher geometrical resolution is possible in principle, which would however considerably increase the cost or limit the maximum transport speed. The optimum for the resolution of the line camera is at 1024 pixels; preferably, the illumination sources 28, 28', 28" are individually automatically controlled.

Commercial Applicability and Usefulness:

The invention is preferred in the printing technology field when employed in the operation as an image-recording camera at a printing machine for scanning of picture patterns moving relative to a image-recording camera and their synchronization. The usefulness of the invention comprises that the invention provides a geometrically equalized line-scanning pattern of the picture pattern to be recorded, where the line-scanning pattern is freely programmable with respect to its parameters image start and line width, and where the line-scanning pattern is freed as much as possible from an interfering phase jitter. The line-scanning pattern is freely programmable in its parameters offset and line distance such that the rigid coupling is eliminated between the pulses of an incremental transmitter and the line addresses. The constancy of the aperture of the individual image-points is also advantageous such that there results an improved measurement accuracy of the image details with a high contrast.

We claim:

1. Method for the line-by-line synchronization of the image recording of monochrome recordings and color recordings with light-sensitive sensors (25, 26'), where an object (II) to be scanned moves relative to the light-sensitive sensors (25, 26'), employing a timer, a computer, and an incremental transmitter, generating a pulse, wherein a line-scanning pattern is generated as a reference line-scanning pattern, characterized in that the line-scanning pattern is generated by a programmable counter arrangement, wherein the programmable counter arrangement includes a measurement line counter (CT2) and a further counter (CT1), preconnected relative to the measurement line counter (CT2), and wherein the computer and the programmable counter arrangement measure the phase position of the line-scanning pattern, generated by the counter arrangement, at the point in time of the arrival of a pulse of the incremental transmitter, wherein the computer and the programmable counter arrangement compare the phase position with a coordinated calculated or tabulated reference value of a reference value table, and wherein the computer and the programmable counter arrangement employ the thus obtained phase difference to influence the counter (CT1) in its count volume, wherein the counter (CT1) is preconnected to the measurement line counter (CT2) in order to generate therefrom the exact position of measurement lines.

2. Method for the line-by-line synchronization of the image recording of monochrome recordings and color recordings with photosensitive lines of objects moving relative to a sensor, employing a timer, a computer, and an incremental transmitter, characterized in that a programmable counting arrangement generates a line-scanning pattern and a timer measures the phase position of the line-scanning pattern, generated by the counter arrangement, with the aid of the computer and a programmable counting arrangement at the point in time of the arrival of a pulse of the incremental transmitter, and the timer compares these with a coordinated calculated or tabulated reference value of a reference value table, and employs the thus obtained phase difference to influence a counter, preconnected to the line counter CT2 with respect to its count volume; wherein the timer subdivides the measurement lines of the image recording device into two or more scanning lines if the integration time of the photosensitive lines within the measurement lines results in a exposure higher than the operating limit of the sensors.

3. Method according to claim 1 or 2, characterized in that the timer shifts the phase of the cycles of the light-sensitive sensor such that the center of gravity of the weighting function of the sensitivity of the scanning line remains locally constant over the respectively to be scanned image line while the transport speed of the object (II) is variable.

4. Method according to claim 1, characterized in that a phase comparison between the position of the moving object, for example a printing cylinder (II), and the actual position of the line-scanning pattern is performed with each flank of a pulse of the incremental transmitter.

5. Method for the line-by-line synchronization of the image recording of monochrome recordings and color recordings with photosensitive lines of objects moving relative to a sensor, employing a timer, a computer, and an incremental transmitter, characterized in that a programmable counting arrangement generates a line-scanning pattern and a timer measures the phase position of the line-scanning pattern, generated by the counter arrangement, with the aid of the computer and a programmable counting arrangement at the point in time of the arrival of a pulse of the incremental transmitter, and the timer compares these with a coordinated calculated or tabulated reference value of a reference value table, and employs the thus obtained phase difference to influence a counter, preconnected to the line counter CT2 with respect to its count volume; wherein a phase comparison between the position of the moving object, for example a printing cylinder, and the actual position of the line-scanning pattern is performed with each flank of the incremental transmitter; and wherein the phase comparison is performed according to the following relation:

$$\phi_i * (R + k * d) = y_{off} + j * y_b + y_1 \qquad (1)$$

where:

$\phi_i$—expectation value of the angle of the incremental transmitter $2R$—diameter of the cylinder $k$—constant $0 < k < 1$ $d$—paper thickness $y_b$—line width $j$—line index, line address $y_1$—fractional rational part of the line address.

6. Method for the line-by-line synchronization of the image recording of monochrome recordings and color recordings with photosensitive lines of objects moving relative to a sensor, employing a timer, a computer, and an incremental transmitter, characterized in that a programmable counting arrangement generates a line-scanning pattern and a timer measures the phase position of the line-scanning pattern, generated by the counter arrangement, with the aid of the computer and a programmable counting arrangement at the point in time of the arrival of a pulse of the incremental transmitter, and the timer compares these with a coordinated calculated or tabulated reference value of a reference value table, and employs the thus obtained phase difference to influence a counter, preconnected to the line counter CT2 with respect to its count volume; wherein a phase comparison between the position of the moving object, for example a printing cylinder, and the actual position of the line-scanning pattern is performed with each flank of the incremental transmitter; and wherein both the integer as well as the fractional rational part of the line address is evaluated for each flank of the incremental transmitter for avoiding rounding errors.

7. Method according to claim 5, characterized in that the systematic components of the error are learned by a teach-in process and for this purpose the expectation values for the angle $\phi$hd i are averaged over several rotations in a computer and are entered into a table, wherein the reference values of the integer and fractional rational parts of the line address according to equation (1) are calculated from the expectation values for each pulse of the incremental transmitter, wherein the thus determined table is maintained in the computer and is again reloaded for each new set of parameters ($y_{off}$, k, d, $y_b$) according to equation (1).

8. Method according to claim 7, characterized in that the coordination of the expectation value of the $\phi_i$ and ($y_{off}$, $y_1/y_b$) is superposed with a nonlinear correction function for the correction of geometrical errors.

9. Method for the line-by-line synchronization of the image recording of monochrome recordings and color recordings with photosensitive lines of objects moving relative to a sensor, employing a timer, a computer, and an incremental transmitter, characterized in that a programmable counting arrangement generates a line-scanning pattern and a timer measures the phase position of the line-scanning pattern, generated by the counter arrangement, with the aid of the computer and a programmable counting arrangement at the point in time of the arrival of a pulse of the incremental transmitter, and the timer compares these with a coordinated calculated or tabulated reference value of a reference value table, and employs the thus obtained phase difference to influence a counter, preconnected to the line counter CT2 with respect to its count volume; wherein the phase difference Cy(t) is smoothed by means of a sliding average-value filter according to the following equation (3) and a new actual line length is calculated from this value according to the following equation (4), which new actual line length is output by means of the interface to CT1.

10. Method according to claim 1, characterized in that an estimate of the optimum subdivision of the integration regime for the actual measurement line is determined on the basis of the measurement of the time duration of the respective preceding interval, wherein the computer reads the time duration of the preceding measurement line and calculates therefrom the intervals of the scanning lines, which scanning lines are accumulated in the following image point by image point in the framework of the measurement line, and the corresponding dark current values are subtracted, and the thus obtained value is divided by the effective integration time.

11. Method for the line-by-line synchronization of the image recording of monochrome recordings and color recordings with photosensitive lines of objects moving relative to a sensor, employing a timer, a computer, and an incremental transmitter, characterized in that a programmable counting arrangement generates a line-scanning pattern and a timer measures the phase position of the line-scanning pattern, generated by the counter arrangement, with the aid of the computer and a programmable counting arrangement at the point in time of the arrival of a pulse of the incremental transmitter, and the timer compares these with a coordinated calculated or tabulated reference value of a reference value table, and employs the thus obtained phase difference to influence a counter, preconnected to the line counter CT2 with respect to its count volume; wherein an estimate of the optimum subdivision of the integration regime for the actual measurement line is determined on the basis of the measurement of the time duration of the respective preceding interval, wherein the computer reads the time duration of the preceding measurement line and calculates therefrom the intervals of the scanning lines, which scanning lines are accumulated in the following image point by image point in the framework of the measurement line, and the corresponding dark current values are subtracted, and the thus obtained value is divided by the effective integration time.

12. Method according to claim 1, characterized by the following features:

a) the object is imaged over n first objectives in n measurement modules onto n line-shaped image conductors, b) the n image conductors are combined on the output side to an optical plug connector such that the n line-shaped image conductors form a regular layer structure, c) the outputs of the image conductors are imaged onto m sensors by means of an optical relay system by means of second objectives and possibly further objectives, beam subdividers and/or color subdividers and/or color filters, d) each of the m sensors is comprised of a regular structure with at least n photosensitive lines or e) the object is imaged by means of n first objectives in m measurement modules onto n line-shaped image conductors which comprise m layers, f) the m*n outputs of the image conductors in m plug connectors are combined with a regular layer structure such that exactly one image conductor of each measurement head module is contained in the respective plug connector, g) each of the m optical plug connectors is imaged onto one of the sensors by means of an optical system of two objectives and possibly further objectives and/or color filters, h) each of the m sensors is comprised of a regular structure with at least n photosensitive lines.

13. Arrangement for the line-by-line synchronization of the image recording of monochrome recordings and color recordings with light-sensitive sensors (26, 26') for scanning an object (II), movable relative to the sensors, with a timer, a computer, and an incremental transmitter, generating a pulse, as well as a generated line-scanning pattern as a reference line-scanning pattern, characterized in a programmable counter arrangement, generating the line-scanning pattern, which counter arrangement comprises a measurement line counter (CT2) and a further counter (CT1), preconnected to the measurement line counter (CT2), and wherein the computer and the programmable counter arrangement measure the phase position of the line-scanning pattern, generated by the counter arrangement, at the point in time of the arrival of a pulse of the incremental transmitter, wherein the computer and the programmable counter arrangement compare the phase position with a coordinated, calculated and tabulated reference value of a reference value table, and wherein the computer and the programmable counter arrangement is capable to employ the thus obtained phase difference in order to influence the counter (CT1), preconnected to the measurement line counter (CT2), in its count volume in order to generate therefrom the exact position of the measurement lines.

14. Arrangement according to claim 13, characterized in that the light-sensitive sensors are charge-coupled device CCD camera, where the charge-coupled device CCD cameras comprise several compact camera modules which are disposed next to each other.

15. Arrangement according to claim 13, characterized by the following features:

a) n first objectives and n line-shaped image conductors as well as n measurement modules for the imaging of the object by means of the n first objectives in the n measurement modules onto the n image conductors, b) the n image conductors are combined on their output side to an optical plug connector, wherein the n line-shaped image conductors form a regular layer structure, c) an optical relay systems as well as second objectives and possibly further objectives, beam splitters and/or color subdividers and/or color filters, wherein m sensors are connected following to the objectives, beam splitters and/or color subdividers and/or color filters, d) each of the m sensors comprises a regular structure with at least n photosensitive lines or e) n first objectives and n line-shaped image conductors, which comprise m layers, as well as m measurement modules for the imaging of the object by means of the first n objectives in the m measurement modules onto the n image conductors, f) the m*n outputs of the image conductors in m plug connectors are combined with a regular layer structure such that exactly one image conductor out of each measurement head module is contained in the respective plug connector, g) an optical system of two objectives and possibly further objectives and/or color filters, wherein the sensors are connected following to the objectives and/or color filters for the imaging of each one of the m optical plug connectors by means of the optical system onto one of the sensors, h) each of the m sensors is comprised of a regular structure with at least n photosensitive lines.

16. Arrangement according to claim 15, characterized in that the optical relay system is a receiver optic.

* * * * *